Feb. 28, 1950  H. W. BEAVER  2,499,051
RAKING AND LOADING MEANS FOR PEANUT HARVESTERS
Filed March 23, 1945  6 Sheets-Sheet 1

INVENTOR
HARTSELL W. BEAVER
BY
ATTORNEY

Feb. 28, 1950     H. W. BEAVER     2,499,051
RAKING AND LOADING MEANS FOR PEANUT HARVESTERS
Filed March 23, 1945     6 Sheets-Sheet 2

INVENTOR
HARTSELL W. BEAVER
BY
ATTORNEY

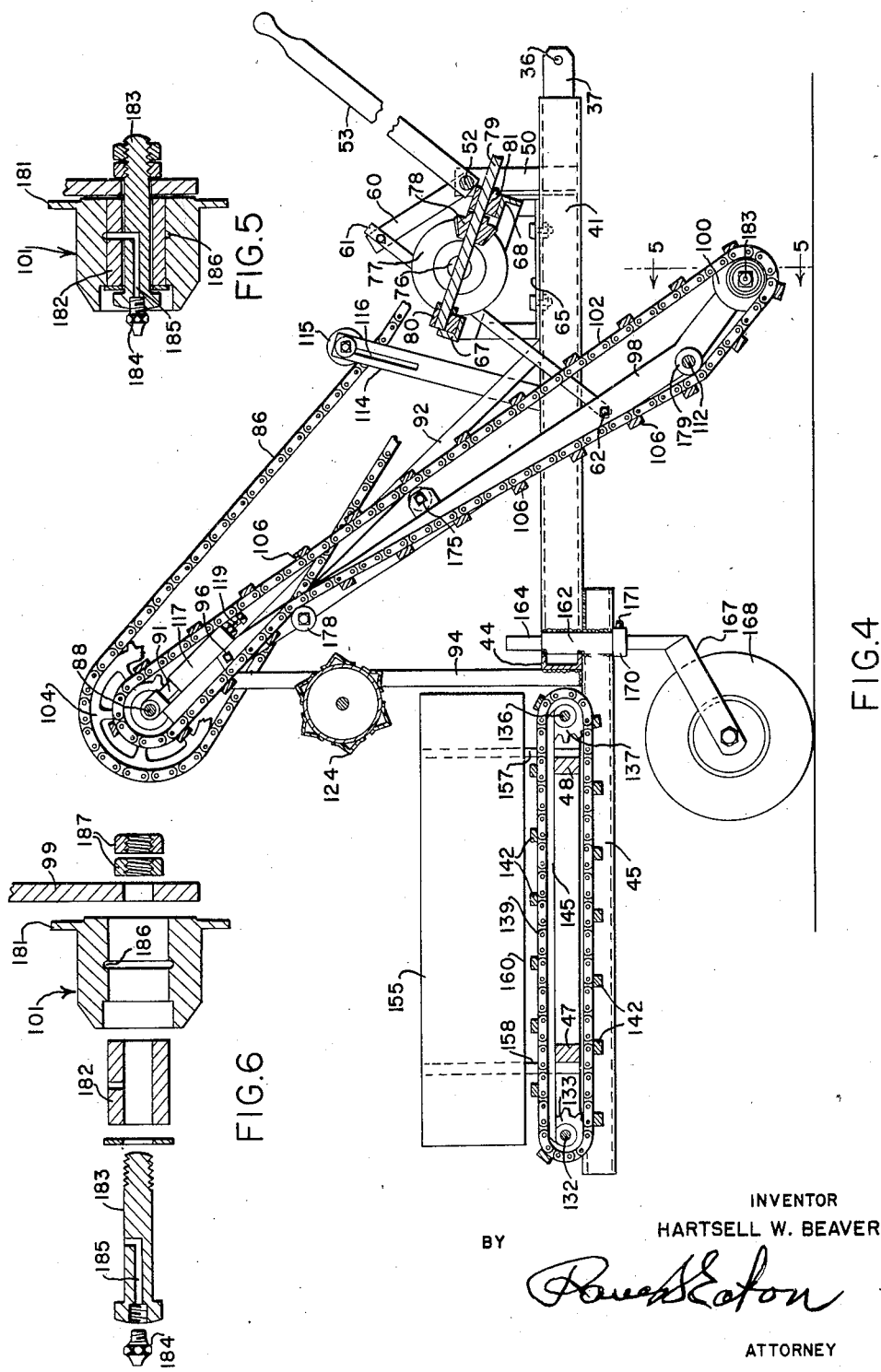

Feb. 28, 1950 H. W. BEAVER 2,499,051
RAKING AND LOADING MEANS FOR PEANUT HARVESTERS
Filed March 23, 1945 6 Sheets-Sheet 5
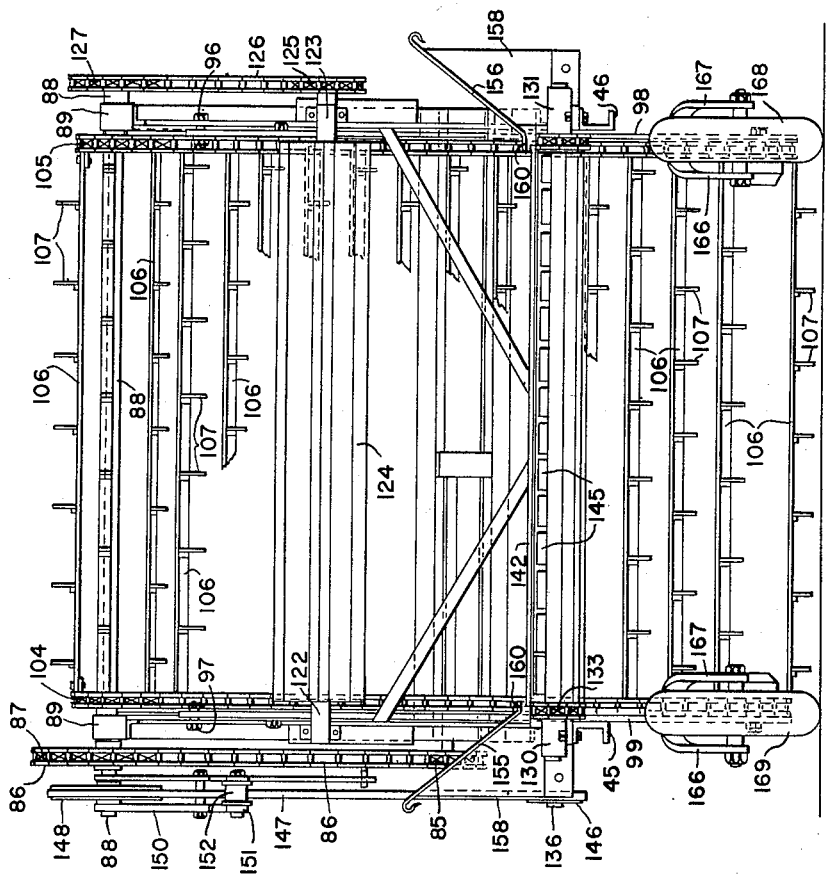
INVENTOR
HARTSELL W. BEAVER
BY
ATTORNEY Feb. 28, 1950 H. W. BEAVER 2,499,051
RAKING AND LOADING MEANS FOR PEANUT HARVESTERS
Filed March 23, 1945 6 Sheets-Sheet 6
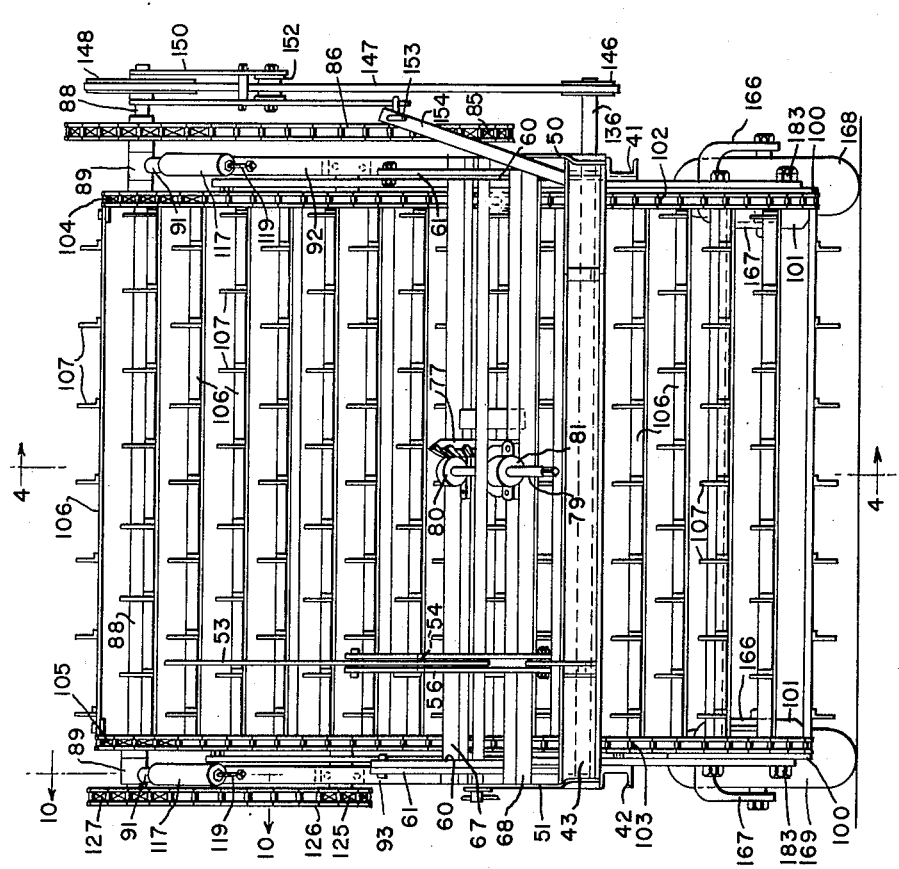
INVENTOR
HARTSELL W. BEAVER
BY
ATTORNEY Patented Feb. 28, 1950

2,499,051

UNITED STATES PATENT OFFICE 2,499,051

RAKING AND LOADING MEANS FOR PEANUT HARVESTERS

Hartsell W. Beaver, Statesville, N. C., assignor to Turner Manufacturing Company, Statesville, N. C., a corporation of North Carolina Application March 23, 1945, Serial No. 584,402

3 Claims. (Cl. 56—347)

This invention relates to means for gathering loose vegetation off the ground and elevating the same onto a suitable intermittently operable conveyor whereby the vegetation can be piled in bunches over a field.

This invention is particularly adapted for the harvesting of peanuts though it is also capable of being used for harvesting any kind of vegetation suitable to be handled by the herein disclosed apparatus.

It is an object of this invention to provide a vegetation harvester comprising a wheeled framework adapted to be secured to a prime mover such as a tractor and to be driven by the tractor and having elevating means for picking up the vegetation from the ground and elevating the same and depositing it at a point in the wheeled framework and then providing intermittently operable means, whereby, when a predetermined amount of vegetation has been deposited on the wheeled framework, it can be dumped from the wheeled framework onto the ground without stopping the forward movement of the wheeled framework.

It is another object of this invention to provide a peanut harvester adapted to be secured to and pulled across a field by a tractor, said tractor having suitable plows or scrapers thereon for uprooting the peanuts and shaking most of the soil therefrom and depositing them onto the ground, and then the wheeled framework secured to the rear end of the tractor has means whereby the uprooted peanut plants with the peanuts thereon can be elevated into the wheeled framework and deposited onto a suitable conveyor together with means operable by the driver of the tractor for activating the conveyor at suitable times to move the deposited peanut plants from the wheeled framework and deposit them in a pile on the ground as the tractor and wheeled framework move over the ground.

Figure 1:
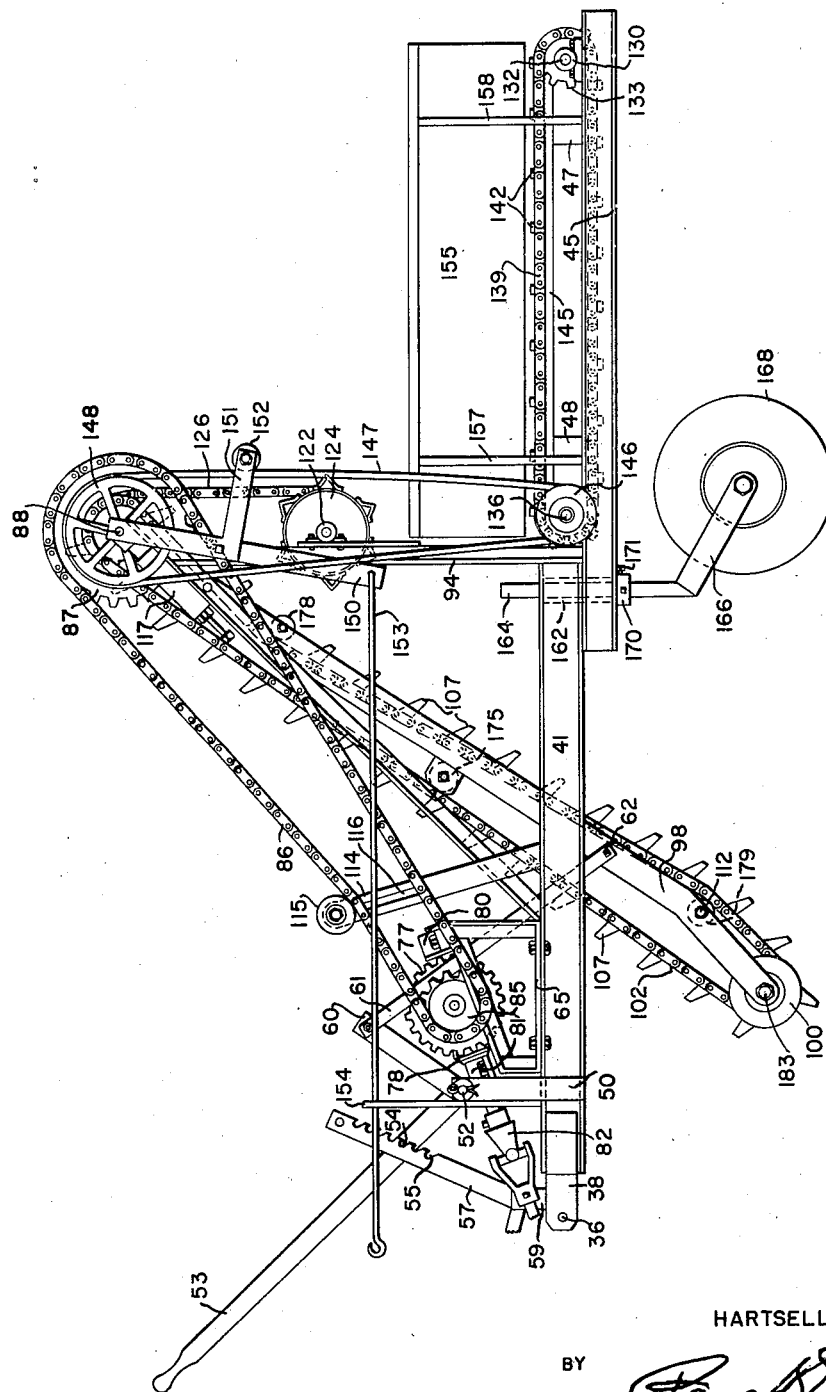
Figure 2:
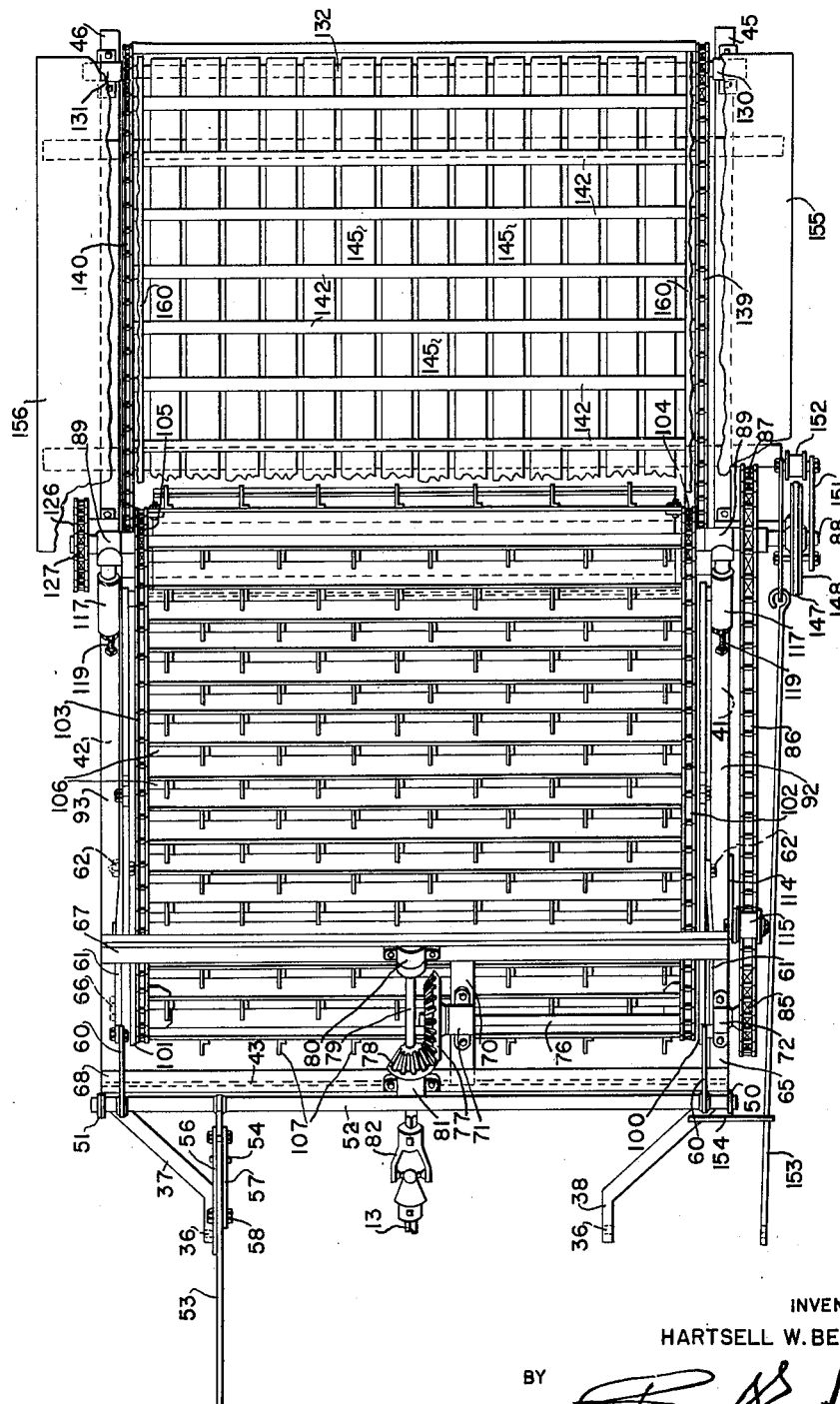
Figure 3:
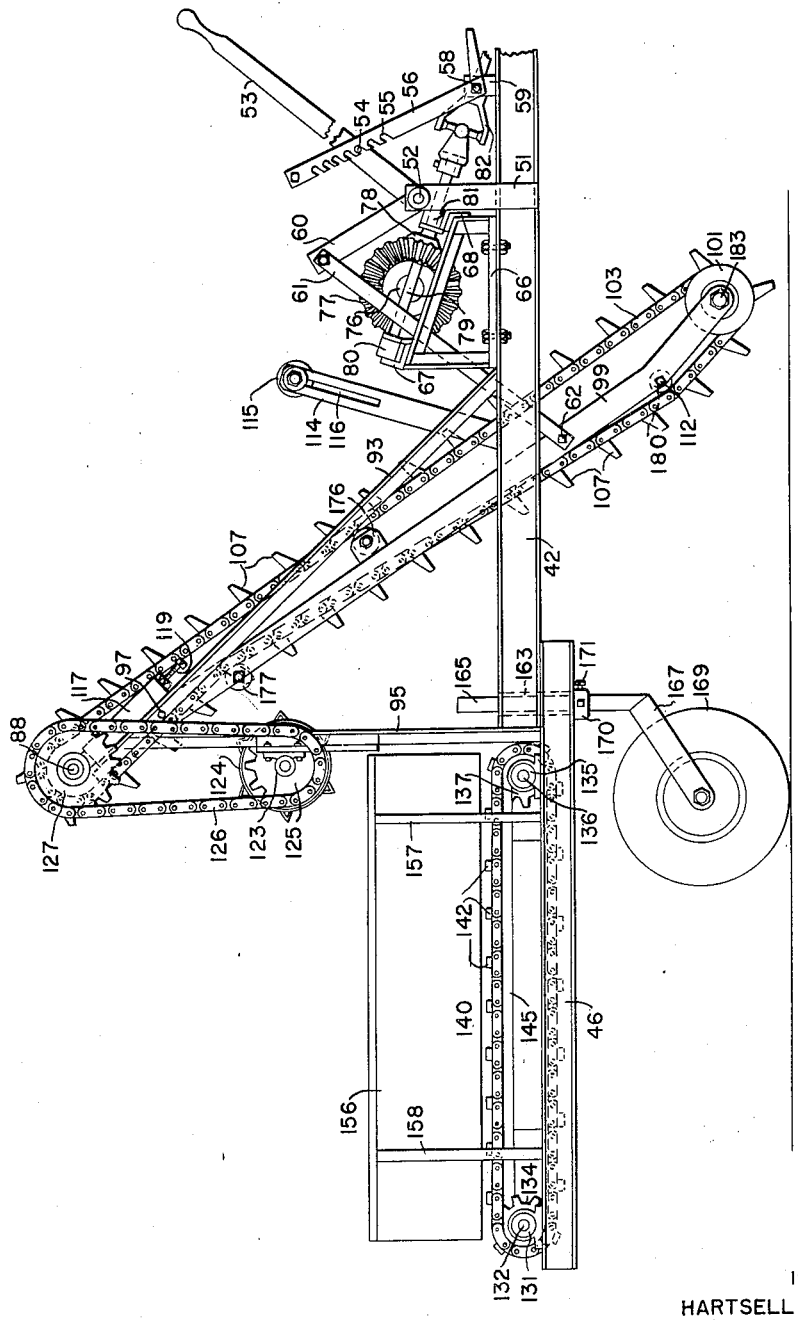

Some of the objects of the invention having been stated, other objects will appear as the description proceeds when taken in connection with the accompanying drawings in which:

Figure 1 is a side elevation of the harvester;
Figure 2 is a top plan view of Figure 1;
Figure 3 is an elevation of the other side of the harvester from that shown in Figure 1;
Figure 4 is a longitudinal sectional view taken along the line 4—4 in Figure 9;
Figure 5 is a vertical sectional view taken along the line 5—5 in Figure 4;
Figure 6 is an exploded sectional view of the structure shown in Figure 5;

Figure 7 is an isometric view of one end of one of the cross-bars on the elevating conveyor showing the means for attaching the cross-bars to the chain which supports the bars;
Figure 8 is a rear elevation of the apparatus;
Figure 9 is a front elevation of the apparatus;
Figure 10 is a longitudinal sectional view taken through one of the bearings for supporting the upper shaft which supports the elevating conveyor and taken along the line 10—10 in Figure 9.

Referring more specifically to the drawings, the numerals 37 and 38 indicate two draw bars each having a hole 36 therethrough for securing the frame to be hereinafter described to a suitable tractor.

The rear end of the draw-bars 37 and 38 are welded to longitudinal frame members 41 and 42 and between the front end of members 41 and 42 is welded a cross-bar 43 and between the rear ends of these longitudinal bars 41 and 42 is welded a cross-bar 44. Welded to the lower edges of the bars 41 and 42 are the rearwardly projecting side bars 45 and 46 and between these rearmost side bars 45 and 46 are cross-bars 47 and 48, these being secured by any suitable means such as bolts, not shown.

Secured to the front portion of the side bars 41 and 42 and rising upwardly therefrom, are bars 50 and 51 in which a shaft 52 is mounted for oscillation, said shaft having a lever 53 secured thereto by welding or otherwise and projecting upwardly and forwardly. This lever 53 has a pin 54 projecting from both sides thereof which is adapted to be positioned in any one of the notches 55 in a pair of bars 56 and 57 pivoted at their lower ends as at 58 to an uprising member 59 secured to and rising upwardly from the draw-bar 37. The shaft 52 also has bell crank portions 60 projecting upwardly and rearwardly therefrom, to each of which is pivotally secured one end of links 61, the other end of links 61 being pivotally connected as at 62 to the elevating conveyor frame to be presently described. The bell cranks 60 and links 61 appear on both sides of the machine and like reference characters will apply.

Secured to the upper surfaces of the side bars 41 and 42 are truss members 65 and 66, on the upper surface of which are secured cross-bars 67 and 68 which are usually angle bars. On these cross-bars 67 and 68 is mounted a cross-bar 70 and on this bar 70 is a bearing 71. A similar bearing 72 is mounted on the upper surface of truss 65, and in these bearings there is rotatably mounted a shaft 76 which has a bevelled gear 77 secured thereon which meshes with another bevelled gear 78 secured on a shaft 79 rotatably mounted in bearings 80 and 81 secured intermediate the ends of cross-bars 67 and 68.

On the front end of shaft 79 is fixedly secured a conventional universal joint 82 whose forward end is adapted to be fixedly secured to the drive shaft of the tractor, not shown, by any suitable means.

The outer end of shaft 76 has fixed thereon a sprocket wheel 85 on which a sprocket chain 86 is mounted. This sprocket chain is also mounted on a sprocket wheel 87 fixed on a transverse shaft 88 mounted in bearings 89. These bearings are identical and will bear like reference characters. Sloping bars 92 and 93 are provided, whose lower ends are welded to the side bars 41 and 42 and whose upper ends are welded to upright angles 94 and 95 whose lower ends are welded to the cross-bar 44 and the side bars 45 and 46 of the rear frame. The bars 92, 93, 94 and 95 comprise what may be termed a superstructure for the peanut harvester.

Pivotally secured as at 96 and 97 are the upper ends of bars 98 and 99 and on the lower ends of which are mounted the rollers 100 and 101 and on these rollers sprocket chains 102 and 103 are mounted. These sprocket chains 102 and 103 are also mounted on sprocket wheels 104 and 105 fixed on the transverse shaft 88. The sprocket chains 102 and 103 have secured therebetween a plurality of cross-bars 106, each having a plurality of teeth 107 projecting therefrom. The manner in which these cross-bars 106 are connected to the sprocket chains is shown in Figure 7 where occasional ones of the links 108 of each of the sprocket chains 102 and 103 have a right angle portion 110 projecting inwardly and the ends of the bars 106 are secured to this angle portion 110 by means of a bolt 111.

The two bars 98 and 99 are spaced from each other by a strut or rod 112 which is disposed near the lower ends of the bars 98 and 99. The position of the lower end of the conveyor formed by the chains 102 and 103 and the cross-bars 106, is regulated by the links 61 and lever 53, as previously described.

Rising upwardly from the side frame member 41 is a bar 114 having a tightener pulley 115 slidably mounted in a slot 116 in bar 114 for keeping the sprocket chain 86 taut at all times.

The bearings 89, as previously described, have a shaft 91 integral therewith and this shaft is slidably mounted in a barrel 117 which has threadably mounted in the lower end thereof, a nut 118 in which is mounted a set screw 119 for regulating the position of the bearings 89 to give the proper tautness to the conveyor chains 102 and 103.

On the two uprights 94 and 95, bearings 122 and 123 are mounted in which the studs on the ends of a beater cylinder 124 are mounted for rotation, and on one of these studs is mounted a sprocket wheel 125, on which a sprocket chain 126 is mounted; the chain 126 is also mounted on a sprocket wheel 127 mounted on one end of shaft 88. This imparts rotary motion to the beater 124 in the same direction as the direction in which the conveyor chains 102 and 103 are moving on their upper portions but the upper surface of the beater 124 and the lower portion of conveyor chains 102 and 103 are running in opposite directions. This causes the beater 124 to prevent any vegetation on the cross-bars 106 from being carried back down on the lower side of the conveyor bars 106 and serves to kick the peanut plants rearwardly to allow them to fall downwardly onto the dumping conveyor to be presently described.

On the rear end of side bars 45 and 46 of the rear frame portion of the apparatus there are bearings 130 and 131 in which a shaft 132 is mounted for rotation, and this shaft has sprockets 133 and 134 fixedly mounted thereon. Near the front end of the side bars 45 and 46 are bearings 135 in which a shaft 136 is rotatably mounted, this shaft having sprocket wheels 137 thereon near each end on which sprocket chains 139 and 140 are mounted, said sprocket chains also being mounted on the sprocket wheels 133 and 134. These sprocket chains have spanning the distance therebetween, a plurality of spaced bars 142 which are secured to the sprocket chains 139 and 140 in the same manner as previously described for the sprocket chains 102 and 103 and which structure is specifically shown in Figure 7. Mounted on top of the cross-bars 47 and 48 and extending longitudinally of the frame is a plurality of spaced slats 145 and on which the upper portion of the slats 142 slide when the conveyor is activated to move these slats 142 rearwardly.

One end of the transverse rotatable shaft 136 projects outwardly from one side of the frame and has fixedly secured thereon, a V-pulley 146 on which a V-belt 147 is mounted. This belt extends upwardly and is also mounted on a V-pulley 148 fixed on transverse rotatable shaft 88.

Pivoted at its upper end on shaft 88 is a downwardly depending bar 150 which has a rearwardly projecting leg 151 provided with a roller 152 on its free end. The lower end of leg 150 has pivotally secured thereto an elongated link 153 which extends forwardly to within reach of the driver of the tractor so that since the V-belt 147 is usually loosely mounted on the two V-pulleys 146 and 148 and will not cause rotation to be imparted to shaft 136, the driver can pull the link 153 forwardly to tighten the V-belt 147 to therefore impart rotation to the transverse shaft 136 to actuate the conveyor having transverse slats 142 to dump the vegetation deposited thereon from time to time out at the rear open end of the apparatus. Link 153 is slidably supported at its front end in a vertical bar 154.

Secured to the outer end of the transverse bars 47 and 48 which project outwardly outside the outer edges of the longitudinal bars 45 and 46 are sloping side pieces 155 and 156 which have leg portions 157 and 158 resting on the outwardly projecting portions of transverse bars 47 and 48. The sloping side pieces 155 and 156 each have a narrow horizontal portion 160 projecting over the upper surface of the slats 142 and serve to confine the deposited vegetation from lateral movement relative to the slats 142 but cause the vegetation to be collected on the slats to be dumped rearwardly out of the apparatus.

Mounted at the junction point of the side bars 46 and 42 and 45 and 41 respectively are the vertically disposed tubular members 162 and 163 which are also welded to the angle channel bar 44. In these tubular portions 162 and 163 are mounted for rotation shanks 164 and 165 which project downwardly and rearwardly, being forked at their lower end as at 166 and 167 and have rotatably mounted therein suitable wheels 168 and 169. These shank portions 164 and 165 are limited as to their upward movement in supporting the weight of the frame by adjustable collar 170 secured thereon by any suitable means such as set screw 171.

The side bars 98 and 99 have rollers 175 and 176 for engaging the topmost portions of the conveyor chains 102 and 103 which not only support this upper portion of the conveyor but also gives a jarring effect to the conveyor on that portion which is moving upwardly to aid to shake dirt from the conveyor and from the peanut plants thereon. The bars 98 and 99 also have rollers 177 and 178 thereon near their upper ends for supporting the chains 102 and 103 on their downwardly travel and giving a jarring effect to the chains to remove dirt which may have adhered to the chain and to the transverse bars 106 and the teeth 107.

Also mounted on transverse rod 112 are rollers 179 and 180 beneath which the chains 102 and 103 pass, these latter rollers serving to move the chains 102 and 103 out of a straight line to also give a jarring effect to the conveyor to remove dirt and other objects which may have adhered to therefrom.

The rollers 100 and 101 are identical and a detailed description of roller 101 shown in Figures 5 and 6 will be sufficient. Here the roller 101 has a flange 181 and this roller is mounted on a tubular bearing 182 which is penetrated by a bolt 183 which also penetrates the bar 99 and the bolt has a head portion provided with a grease fitting 184 which communicates with a grease channel 185 which also communicates with an interior groove 186 in roller 101 and the tube 185 and bolt 183 are confined in a fixed position by nuts 187 so that the roller 101 rotates on tube 182.

In the drawings and specification, there has been set forth a preferred embodiment of the invention and although specific terms are employed they are used in a generic and descriptive sense only, and not for purposes of limitation, the scope of the invention being set forth in the appended claims.

I claim:

1. In a peanut harvester comprising a wheeled frame, a superstructure on the frame, a transversely disposed shaft, bearing means adjustably and rotatably mounting the said shaft in the upper end of the superstructure, a pair of conveyor frame bars having one of their ends pivotally mounted in the upper end of the superstructure and extending downwardly and forwardly towards and below the front end of the wheeled frame, a pair of sprocket wheels mounted on the rotatable shaft, a pair of sprocket chains mounted on the sprocket wheels and having spaced bars secured thereto and extending from one chain to the other, said bars having teeth extending therefrom, an idler roller mounted at the lower end of the said conveyor frame bars and on which the pair of sprocket chains are mounted, a driven shaft in the front end of the frame, a transversely disposed shaft having a geared connection with the driven shaft and a driving connection between the transversely disposed shaft and the first-named rotatable shaft, for imparting rotation to the rotatable shaft and to the conveyor chains mounted thereon, means mounted on the frame and connected to the front end of the conveyor frame bars for regulating the height of the front end of the conveyor frame bars relative to the ground.

2. In a peanut harvester for picking up peanut vines which have been dug from the ground comprising a wheeled frame adapted to be connected to a prime mover having a power take-off, uprising members secured to the rear corners of the frame, a pair of side brace bars connected to the upper ends of the uprising members and to an intermediate portion of the frame, a pair of conveyor frame members pivotally mounted at their upper ends on the side brace bars and extending forwardly and downwardly towards the front end of the frame, means mounted near the front end of the frame for supporting the front end of the conveyor frame members and for adjusting the height of the front end of the conveyor frame relative to the ground, a pair of shafts slidably and adjustably mounted on the upper ends of the brace bars, a rotatable shaft mounted in said pair of shafts, a pair of sprocket wheels mounted on the rotatable shaft and each having thereon a sprocket chain, a roller mounted in the free end of each of the conveyor frame members and on which the sprocket chains associated with the conveyor frame members are adapted to have idling movement, the conveyor chains having a plurality of spaced cross bars extending therebetween and having teeth projecting therefrom, a driven shaft disposed longitudinally of the front portion of the frame and having means for connecting the same to the power take-off of the prime mover, a transversely disposed shaft driven by the driven shaft and having a sprocket wheel on one end thereof, a third sprocket wheel mounted on the rotatable shaft and a sprocket chain connecting the two last-named sprocket wheels and whereby rotation may be imparted to the rotatable shaft to impart rotation to the conveyor chains, each of the conveyor frame members having intermediate their ends a roller which the upper reach of the conveyor sprocket chains are adapted to contact during upward and rearward movement of the upper reach of the conveyor sprocket chains.

3. In a peanut harvester comprising a wheeled frame and having a pair of uprights rising from its rear corners and having means on its front end for connecting the same to a tractor, a pair of diagonal braces secured to the upper ends of the uprights and extending forwardly and downwardly and being secured to an intermediate portion of the frame, a tubular member mounted on each of the diagonal braces and having a shaft slidably mounted therein and extending upwardly and rearwardly with relation to the frame, means for adjusting the position of the shafts with relation to the tubular members, the extreme upper and rearmost ends of each of the slidable shafts having a hole therethrough, a rotatable shaft mounted in said holes in said slidable shafts, a pair of side conveyor frame bars pivotally connected at one end to the diagonal brace bars and extending downwardly and forwardly with relation to the frame, an idler roller mounted in the free end of each of the conveyor frame bars, a pair of sprocket wheels mounted on said rotatable shaft, a pair of sprocket chains mounted on said sprocket wheels and also on said idler rollers in the front lower ends of the conveyor frame bars, a plurality of spaced toothed bars having their ends connected to the sprocket chains, for engaging and elevating vegetation, a driven shaft mounted near the front end of the frame and a driving connection between the driven shaft and the rotatable shaft for imparting rotation to the rotatable shaft and the sprocket chains forming a part of the conveyor, each of the conveyor frame bars having an idler roller mounted substantially midway its ends and on which the upper reach of the conveyor is adapted to rest during its upward and rearward travel relative to the conveyor frame.

HARTSELL W. BEAVER.

REFERENCES CITED

The following references are of record in the file of this patent:

UNITED STATES PATENTS

| Number | Name | Date |
|---|---|---|
| 660,944 | Bowen | Oct. 30, 1900 |
| 669,908 | Williams | Mar. 12, 1901 |
| 972,910 | Pippen | Oct. 18, 1910 |
| 1,174,762 | Quance | Mar. 7, 1916 |
| 1,193,746 | Winters | Aug. 8, 1916 |
| 1,375,258 | May | Apr. 19, 1921 |
| 2,151,289 | Warnke | Mar. 21, 1939 |
| 2,297,065 | McLendon | Sept. 29, 1942 |
| 2,389,567 | Thornton | Nov. 20, 1945 |